US005404419A

United States Patent [19]

Artis, Jr.

[11] Patent Number: 5,404,419

[45] Date of Patent: Apr. 4, 1995

[54] WALL-MOUNTED CORDLESS DRYER FOR THE HANDS WITH BATTERY CHARGING CIRCUIT, AM/FM RADIO, AND VERTICAL POSITIONING MEANS

[76] Inventor: Amos Artis, Jr., 523 Quail Dr., Goldsboro, N.C. 27534

[21] Appl. No.: 91,782

[22] Filed: Jun. 25, 1993

[51] Int. Cl.[6] ........................ F24H 3/00; A47K 10/48; A47J 27/00; F26B 3/02

[52] U.S. Cl. .................................... 392/381; 392/382; 34/90; 34/239; 34/523; D28/54.1; 455/344; 320/2

[58] Field of Search ............... 392/381, 382, 379, 380, 392/363; 34/96, 97, 202, 90, 91, 239, 523; 455/344; 320/2; D28/54.1

[56] References Cited

U.S. PATENT DOCUMENTS

| | | | |
|---|---|---|---|
| 2,370,359 | 2/1945 | McCart | 34/90 |
| 2,853,591 | 9/1958 | Fine | 392/380 |
| 2,966,550 | 12/1960 | Golberg et al. | 455/344 |
| 3,377,715 | 4/1968 | Hubner | 392/380 |
| 3,391,470 | 7/1968 | Chedister | 320/2 |
| 4,461,439 | 7/1984 | Rose | 248/51 |
| 4,635,382 | 1/1987 | Bourdeau | 34/97 |
| 4,641,014 | 2/1987 | Bland | 34/90 |
| 4,644,136 | 2/1987 | Watchman | 219/385 |
| 4,683,888 | 8/1987 | Kramer et al. | 455/344 |
| 4,707,933 | 11/1987 | Keck et al. | 34/97 |
| 4,746,090 | 5/1988 | Hamilton | 248/314 |
| 4,757,183 | 7/1988 | Karey et al. | 320/2 |
| 4,785,162 | 11/1988 | Kuo | 34/239 |
| 4,800,654 | 1/1989 | Levin et al. | 34/97 |
| 4,802,287 | 2/1989 | Chen | 34/91 |
| 5,181,328 | 1/1993 | Bouverie | 34/97 |
| 5,195,253 | 3/1993 | Poumey et al. | 392/385 |

FOREIGN PATENT DOCUMENTS

| | | | |
|---|---|---|---|
| 172020 | 2/1986 | European Pat. Off. | 392/381 |
| 530726 | 3/1993 | European Pat. Off. | 392/380 |
| 2754304 | 6/1979 | Germany | 392/379 |
| 2170705 | 8/1986 | United Kingdom | 34/96 |

*Primary Examiner*—John A. Jeffery
*Attorney, Agent, or Firm*—Richard L. Miller

[57] ABSTRACT

A cordless versatile dryer consists of an operating unit for blowing heated air carried within a housing for mounting onto a wall and having an optional radio housed therein. A manually adjusted L-shaped nozzle is rotatively affixed to the housing to direct the blown heated air in various directs to dry hands, face and hair. A battery pack is removably affixed to the housing and is electrically plugged into the operating unit. An optional eject button will release the battery pack and disengage it from the operating unit. A scale is attached to a track for measuring the height of persons standing under the housing, which travels on the scale, when the housing is placed in contact with the person's head.

3 Claims, 1 Drawing Sheet

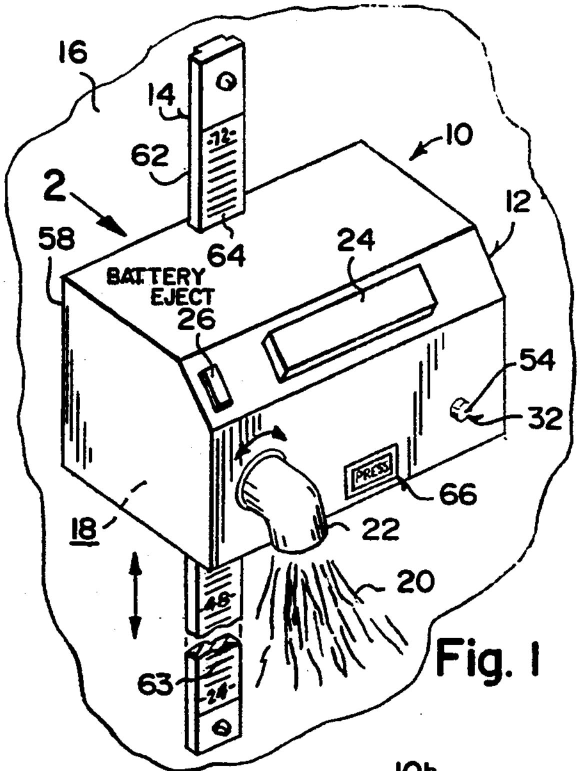
Fig. 1
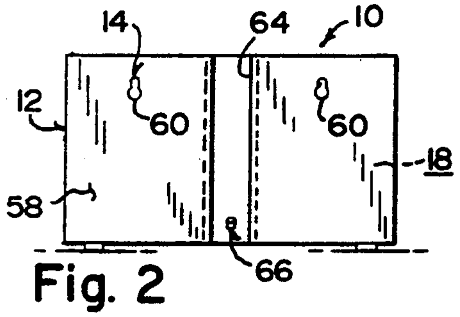
Fig. 2
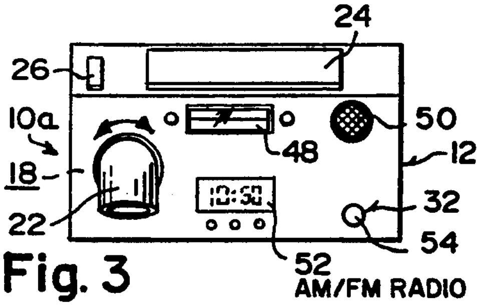
Fig. 3
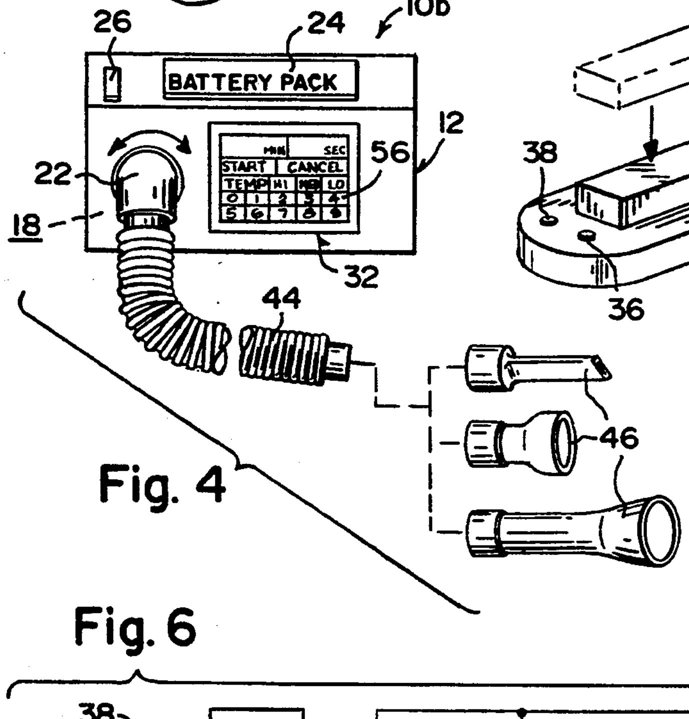
Fig. 4
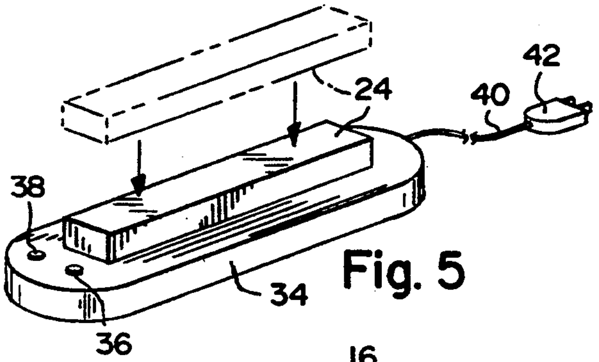
Fig. 5
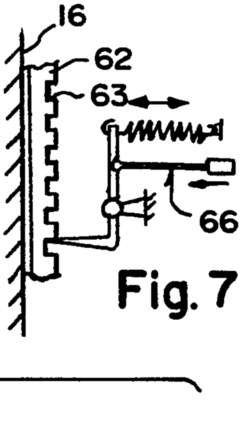
Fig. 7
Fig. 6
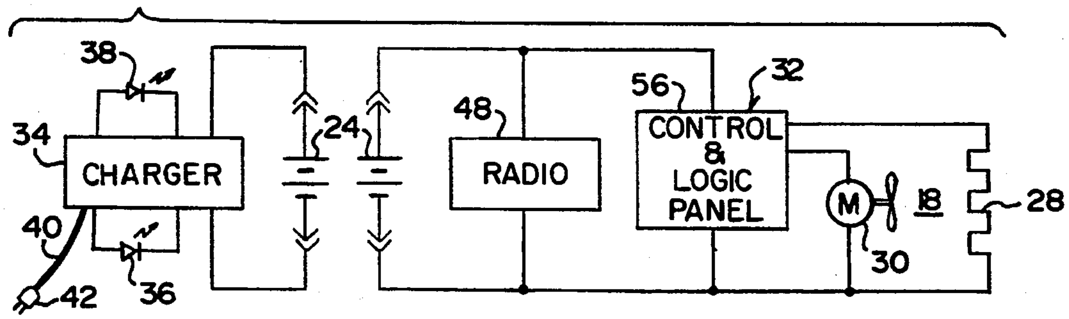

WALL-MOUNTED CORDLESS DRYER FOR THE HANDS WITH BATTERY CHARGING CIRCUIT, AM/FM RADIO, AND VERTICAL POSITIONING MEANS

BACKGROUND OF THE INVENTION

The instant invention relates generally to hot air dryers and more specifically it relates to a cordless versatile dryer.

Numerous hot air dryers have been provided in the prior art that are adapted to dispense a flow of hot air for drying a person's hands, face and hair. For example, U.S. Pat. Nos. 4,635,382 to Bourdeau; 4,707,933 to Keck et al. and 4,800,654 to Levin et al. all are illustrative of such prior art. While these units may be suitable for the particular purpose to which they address, they would not be as suitable for the purpose of the present invention as hereafter described.

SUMMARY OF THE INVENTION

A primary object of the present invention is to provide a cordless versatile dryer that will overcome the shortcomings of the prior art devices.

Another object is to provide a cordless versatile dryer that is adjustable and wall mounted to offer a convenient, sanitary way to dry hands and other parts of the body and yet can serve the auxiliary purpose of substituting as a height measuring device for young children and others.

An additional object is to provide a cordless versatile dryer that will eliminate the danger of electrical shock caused by cords and outlets needed by conventional dryers.

A further object is to provide a cordless versatile dryer that is simple and easy to use.

A still further object is to provide a cordless versatile dryer that is economical in coat to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWINGS FIGURES

The figures in the drawings are briefly described as follows:

FIG. 1 is a diagrammatic perspective view of a first embodiment of the instant invention;

FIG. 2 is a diagrammatic rear elevational view taken in the direction of arrow 2 in FIG. 1;

FIG. 3 is a diagrammatic front elevational view of a second embodiment of the instant invention which incorporates a radio therewith;

FIG. 4 is a diagrammatic front elevational view of a third embodiment of the instant invention, and illustrated with some accessories therefore;

FIG. 5 is a diagrammatic perspective view of a battery charging component thereof;

FIG. 6 is an electrical schematic diagram of the second embodiment; and

FIG. 7 is a diagrammatic view illustrating a mechanical release mechanism for permitting adjusting the height of the blower housing.

DETAILED DESCRIPTION OF THE PREFERRED EMBODIMENTS

Turning now descriptively to the drawings, in which similar reference characters denote similar elements throughout the several views, FIG. 1 and illustrate a cordless versatile dryer 10 which consists of a housing 12 and structure 14 for mounting the housing 12 onto a wall 16. An operating unit 18 is carried within the housing 12, for blowing heated air 20 therefrom. An L-shaped nozzle 22 is rotatively affixed to the housing 12. The nozzle 22 can be manually adjusted to direct the heated air 20 blowing from the operating unit 18 in various directions to dry a person's hand, face and hair. A battery pack 24 is removably affixed to the housing 12 to be electrically plugged into the operating unit 18 for supplying power thereto. An optional eject button 26 may be located on the housing 12 to release the battery pack 24 from the housing 12 and disengage it from the operating unit 18.

The operating unit 18, as shown in FIG. 6, includes an electric heating element 28, a blower 30 and an apparatus 32, for activating the electric heating element 28 and the blower 30. The cordless versatile dryer system can further contain a battery charger 34 for recharging the removable battery pack 24. The battery charger 24 includes a charging indicator lamp 36, a full charge indicator lamp 38 and an electrical cord 40 with an AC plug 42.

As shown in FIG. 4, a flexible hose 44 can be coupled to the adjustable nozzle 22. A plurality of various hose accessories 46 can also be provided, with each connectable to a free end of the flexible hose 44.

As shown in FIGS. 3 and 6, an alternate embodiment of the instant invention has an AM-FM radio 48 with speaker 50 mounted within the housing 12. A digital clock 52 can also be mounted within the housing 12.

The activating apparatus 32 in FIGS. 1 and 3, is an on/off switch 54. The activating apparatus 32 in FIGS. 4 and 6, is a digital control logic panel 56 for time and temperature settings. The mounting structure 14, shown in FIG. 2, includes a back surface 58 of the housing 12 having a pair of spaced apart pear shaped slots 60, so that the slots 60 can alternatively be fitted onto the heads of a pair of fasteners mounted on the wall 16.

The mounting structure 14, shown in FIGS. 1, 2 and 7 consists of a track 62, having a plurality of teeth 63 vertically mounted to the wall 16. The back surface 58 of the housing 12 has a central vertical slot 64 extending there along to engage with and slide on the trace 62. A locking device 66, shown in FIG. 5, is a carried in housing 12 for retaining the dryer 10 on the track 62 in one of a variety of vertical locations, when in engagement with one of the teeth 63 on the track 62.

OPERATION OF THE INVENTION

The dryer 10 can be typically used for drying the hands without any possibility of shock hazard because the entire device is battery powered. When mounted at a correct height on a suitable wall the device the device can also be used as a height gauge to measure the height of persons standing under the housing 12 by reading the numbers on the scale of the track 62 after the housing is placed in contact with a person head.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A cordless versatile dryer which comprises:

a) a housing;

b) means for mounting said housing into a wall;

c) an operating unit including means for blowing heated air therefrom, said unit carried within said housing; and said means for blowing heated air comprising an electric heating element, a blower and means for activating said electric heating element and blower, comprising an on/off switch means including a digital control and logic panel for time and temperature settings and an eject button on said housing adapted to release a battery pack from said housing and disengage it from said operating unit;

d) an L-shaped nozzle rotatively affixed to said housing, so that said nozzle can be manually adjusted to direct the heated air blowing from said operating unit in various directions to dry a person's hands, face and hair;

e) a battery pack removably affixed to said housing to be electrically plugged into said operating unit for supplying power thereto;

f) a battery charger for recharging said removable battery pack and comprising a charging indicator lamp, a full charge indicator lamp, and an electrical cord with an AC plug;

g) a flexible hose coupled to said adjustable nozzle and a plurality of various hose accessories, each connectable to a free end of said flexible hose;

h) an AM-FM radio with speaker mounted within said housing; and i) a digital clock mounted within said housing.

2. A cordless versatile dryer as recited in claim 1, wherein said mounting means includes a back surface of said housing having a pair of spaced apart pear shaped slots, so that said slots can fit onto the heads of a pair of fasteners mounted on the wall.

3. A cordless versatile dryer as recited in claim 1, wherein said mounting means includes:

a) a track having a plurality of teeth vertically mounted to the wall;

b) a back surface of said housing having a central vertical slot extending there along to engage with and slide on said track;

c) a locking device carried in said housing for retaining said dryer on said track in one of a variety of vertical locations, when in engagement with one of the teeth on said track; and d) a scale attached to said track for measuring the height of persons standing under said housing and in intimate contact therewith.

* * * * *